Feb. 17, 1953  J. McMILLAN ET AL  2,628,424
TRANSPARENT CUTTER GUIDE
Filed Sept. 21, 1950

John McMillan
Helen McMillan
INVENTORS

BY Lawrence A. O'Brien
and Harvey B. Jacobson
Attorneys

Patented Feb. 17, 1953

2,628,424

UNITED STATES PATENT OFFICE 2,628,424

TRANSPARENT CUTTER GUIDE

John McMillan and Helen McMillan, Elko, Nev.

Application September 21, 1950, Serial No. 185,991

4 Claims. (Cl. 30—276)

This invention comprises novel and useful improvements in foliage trimmers.

An important object of this invention is to provide a foliage trimmer which has an improved means for guiding the trimmer blade relative to the foliage, together with improved means for shielding and guarding the blade, which shield and guard do not impair the cutting operation.

An important feature of this invention resides in the provision of a semi-circular shield which is secured to the motor housing, which shield has a peripheral depending flange which extends below the path of movement of the cutter blade, whereby the lower edge of the flange provides a guide for the foliage trimmer.

Another important feature of this invention resides in the provision of a foliage trimmer, in accordance with the foregoing feature, together with an L-shaped handle member secured to the motor housing and to the shield flange, whereby the handle member serves to reinforce the shield.

Still another important feature of this invention resides in the provision of a transparent plastic guard member which is disposed above the housing end and has the under portion thereof secured to the shield, which guard member overlies the cutting blade, in spaced relation thereto.

These, together with various ancillary objects and features, are attained by this device, a preferred embodiment of which has been illustrated by way of example only in the accompanying drawings, wherein.

Figure 1:
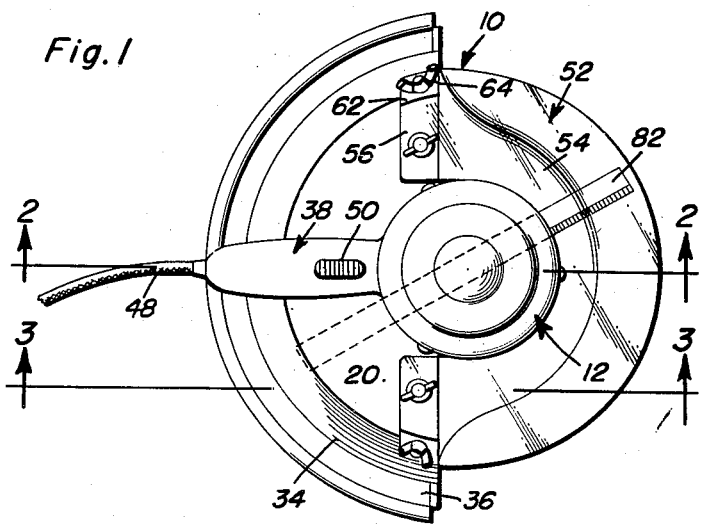
Figure 1 is a top plan view of the foliage trimmer, with the guard member attached thereto.

Reference is now made more specifically to the accompanying drawing, wherein like numerals designate similar parts throughout the various view, and in which the foliage trimmer is indicated generally by the numeral 10.

The foliage trimmer 10 includes a housing 12 having a substantially cylindrical side wall 14, and a bottom wall 16, through which the shaft 18 of the motor which is disposed in the housing extends. A semi-circular plate 20, is secured to the bottom wall 16 by fasteners (not shown), a bearing plate 24, having a bore 26 therein through which the shaft 18 extends, being secured to the bottom wall 16 of the housing 12, by means of a fastener 28, the bearing plate having an offset portion 30 which overlies the shield 20, a fastener 32 extending through the offset portion of the bearing plate, through the shield 20 and into the bottom wall 16 of the housing. The shield 20 has an outwardly flared peripheral flange 34 which extends downwardly relative to the shield, the flange carrying an annular peripheral rim 36 on the lower edge thereof, which rim is disposed substantially parallel to the plane of rotation of the cutter blade, and which rim obviously serves as a guide by means of which the foliage trimmer may be guided on a relatively flat surface.

An L-shaped handle member 38 having first and second legs 40 and 42 is attached to the foliage trimmer, the end of the first leg 40 being secured to the side wall 14 of the housing, in any desired manner, the end of the second leg 42 being secured to the outwardly flared flange 34, as by a fastener 44. The L-shaped handle member has a longitudinally curved passage 46 therein through which extends the conductors 48, which conductors are electrically connected, by means of a switch 50 to the motor which is enclosed in the housing 12.

A transparent guard 52 is adapted to be secured to the foliage trimmer 10, the guard including a U-shaped section 54 having end portions 56 which are adapted to be secured, as by the fastener 58 to the shield 20, fastener 58 extending through the bores 60 in the shield. The U-shaped section 54 also includes the angular offset ears 62, on the end portions thereof, which ears are adapted to overlie the flange 34, and be detachably secured thereto by the fasteners 64 extending through the apertures 66 in the shield.

Figure 2:
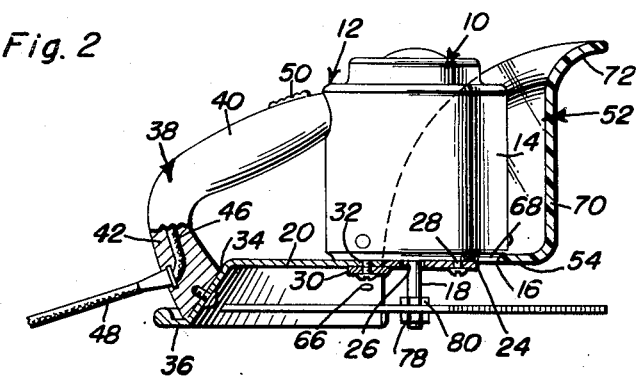
Figure 2 is a side elevational view of the foliage trimmer, with the blade shield and the guard member shown in section.
Figure 3:
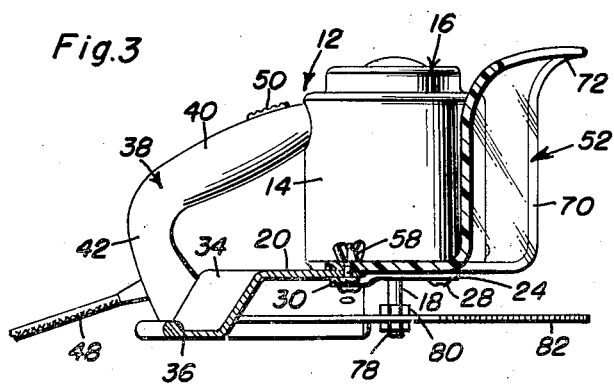
Figure 3 is a sectional elevation of the transparent cutter guard taken substantially on the plane indicated by the line 3—3 of Figure 1.

As it will be appreciated from a consideration of Figure 2, the housing 12 is provided with an annular depression 68 adjacent to the bottom wall 16, in which the inner periphery of the U-shaped section 54 is adapted to be seated to limit upward movement of the U-shaped section 54 relative to the housing. The guard member 52 also includes the upstanding longitudinally arcuate crescent shaped section 70 which is carried by the U-shaped section 54, which section has an outwardly flared portion 72 adjacent to the upper end thereof, the periphery of the outwardly flared portion 72 being disposed substantially in vertical alignment with the circular arc described by the end of the rotating cutting blade, as it is thought apparent from a consideration of Figure 3 of the drawing. It will also be appreciated that the guard 52 will deflect the cut foliage away from the hand of the user, which guard member is so constructed as to not interfere with the efficient cutting of the foliage. It will additionally be appreciated that the use of a transparent guard does not impair the operator's visual perception of the cutting operation. Further, since the inner periphery of the U-shaped section 54 is disposed within the annular depression 68, it is believed obvious that the guard member 52 is materially reinforced thereby.

A cutter blade 82 having cutting edges adjacent the ends of the blade, is detachably secured to the shaft 18, by means of the nut 78, and lock nut 80.

From the foregoing, it is thought that the operation and construction of the device will be readily understood, and further discussion is believed to be unnecessary. However, since numerous modifications will readily occur to those skilled in the art after a consideration of the foregoing specification and accompanying drawing, it is not intended to limit the invention to that shown and described, but all suitable modifications may be resorted to, falling within the scope of the appended claims.

Having described the invention, what is claimed as new is:

1. An electrical cutter comprising a motor having a vertically extending shaft, a housing disposed about said motor, said housing including a bottom wall, said housing having an annular depression adjacent to said bottom wall, a semi-circular shield attached to said bottom wall concentrically with said shaft, a peripheral outwardly flared flange on said shield, said shaft extending through said bottom wall, and a cutter carried by the lower end of said shaft, an L-shaped handle member detachably secured to said housing, and to said shield flange, a semi-annular rim carried by the lower edge of said flange and disposed substantially parallel to said shield, a transparent U-shaped extension of said shield, said extension being secured to said semi-circular shield, the inner periphery of said extension being received in said annular depression, an upstanding longitudinally arcuate crescent shaped portion on said extension, an outwardly flared flange adjacent the upper edge of said crescent shaped portion.

2. An electrical cutter comprising a motor having a vertically extending shaft, a housing disposed about said motor, said housing having a bottom wall, a semi-circular shield attached to said bottom wall concentrically with said shaft, a peripheral outwardly flared flange on said shield, said shaft extending through said bottom wall, and a cutter carried by the lower end of said shaft, a transparent guard including a U-shaped portion having the ends thereof secured to said shield, and an upstanding longitudinally arcuate portion carried by said U-shaped portion, said upstanding portion having an outwardly flared flange on its upper edge.

3. The combination of claim 2 wherein said U-shaped portion has an angularly offset tab adjacent the opposite ends thereof, and means detachably securing said tabs to said shield flange.

4. The combination of claim 2 wherein said housing has an annular depression adjacent the bottom edge thereof, the inner edge of said U-shaped portion of said guard being received in said depression.

JOHN McMILLAN.
HELEN McMILLAN.

REFERENCES CITED

The following references are of record in the file of this patent:

UNITED STATES PATENTS

| Number | Name | Date |
|---|---|---|
| 1,550,342 | Cogley | Aug. 18, 1925 |
| 1,582,359 | Trowbridge | Apr. 27, 1926 |
| 2,091,827 | Mercatoris | Aug. 31, 1937 |

OTHER REFERENCES

Popular Science Magaine (page 197), August 1939.